US012244499B1

(12) United States Patent
Mao et al.

(10) Patent No.: US 12,244,499 B1
(45) Date of Patent: Mar. 4, 2025

(54) PROTOCOL-INDEPENDENT RECEIVE-SIDE SCALING

(71) Applicant: Google LLC, Mountain View, CA (US)

(72) Inventors: Yuhong Mao, Fremont, CA (US); Richard Lee Sites, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/127,367

(22) Filed: Mar. 28, 2023

Related U.S. Application Data

(63) Continuation of application No. 17/187,030, filed on Feb. 26, 2021, now Pat. No. 11,627,083, which is a continuation of application No. 16/504,709, filed on Jul. 8, 2019, now Pat. No. 10,951,524, which is a continuation of application No. 15/678,295, filed on Aug. 16, 2017, now Pat. No. 10,361,955, which is a continuation of application No. 14/734,629, filed on Jun. 9, 2015, now Pat. No. 9,755,972.

(51) Int. Cl.
*H04L 45/7453* (2022.01)
*H04L 45/745* (2022.01)
*H04L 49/90* (2022.01)

(52) U.S. Cl.
CPC .......... *H04L 45/7453* (2013.01); *H04L 49/90* (2013.01); *H04L 45/74591* (2022.05)

(58) Field of Classification Search
CPC ... H04L 45/745; H04L 45/7453; H04L 49/90; H04L 45/74591; G06F 9/45558; G06F 2009/4557; G06F 2212/151; G06F 2212/152; G06F 9/5027

See application file for complete search history.

(56) References Cited

U.S. PATENT DOCUMENTS 6,789,116 B1 * 9/2004 Sarkissian ........... H04L 49/3009
709/224
7,466,703 B1 12/2008 Arunachalam et al.
7,765,405 B2 7/2010 Pinkerton et al.
(Continued)

OTHER PUBLICATIONS

Scalable Networking: Eliminating the Receive Processing Bottleneck-Introducing RSS, WinHEC 2004 Version—Apr. 14, 2004.
(Continued)

*Primary Examiner* — Mohamed A Kamara
(74) *Attorney, Agent, or Firm* — Lerner David LLP (57) ABSTRACT

A system and method for protocol independent receive side scaling (RSS) includes storing a plurality of RSS hash M-tuple definitions, each definition corresponding to one of a set of possible protocol header combinations for routing an incoming packet, the set of possible protocol header combinations being modifiable to include later-developed protocols. Based on initial bytes of the incoming packet, a pattern of protocol headers is detected, and used to select one of the plurality of RSS hash M-tuple definitions. The selected RSS hash M-tuple definition is applied as a protocol-independent arbitrary set of bits to the headers of the incoming packet to form a RSS hash M-tuple vector, which is used to compute a RSS hash. Based on the RSS hash, a particular queue is selected from a set of destination queues identified for the packet, and the packet is delivered to the selected particular queue.

20 Claims, 5 Drawing Sheets

(56) References Cited

U.S. PATENT DOCUMENTS

| | | | |
|---|---|---|---|
| 8,407,413 B1* | 3/2013 | Yucel | H04L 67/1097 |
| | | | 711/108 |
| 8,543,729 B2 | 9/2013 | Pope et al. | |
| 9,755,972 B1 | 9/2017 | Mao et al. | |
| 9,762,497 B2 | 9/2017 | Kishore et al. | |
| 10,361,955 B1 | 7/2019 | Mao et al. | |
| 2002/0116527 A1 | 8/2002 | Chen et al. | |
| 2006/0120373 A1 | 6/2006 | O'Keeffe et al. | |
| 2007/0058633 A1 | 3/2007 | Chen et al. | |
| 2008/0313655 A1* | 12/2008 | Pope | H04L 47/62 |
| | | | 719/319 |
| 2010/0014526 A1 | 1/2010 | Chavan et al. | |
| 2011/0019531 A1 | 1/2011 | Kim et al. | |
| 2011/0023114 A1 | 1/2011 | Diab et al. | |
| 2011/0058573 A1 | 3/2011 | Balakavi et al. | |
| 2011/0116507 A1 | 5/2011 | Pais et al. | |
| 2012/0189013 A1 | 7/2012 | Goglin et al. | |
| 2012/0221590 A1 | 8/2012 | Liu | |
| 2014/0010083 A1 | 1/2014 | Hamdi et al. | |
| 2014/0050091 A1* | 2/2014 | Biswas | H04L 67/1023 |
| | | | 370/235 |
| 2014/0269750 A1 | 9/2014 | Tsirkin | |
| 2014/0301388 A1 | 10/2014 | Jagadish et al. | |
| 2015/0127900 A1 | 5/2015 | Dharmapurikar et al. | |
| 2015/0281081 A1* | 10/2015 | Rajahalme | H04L 45/7453 |
| | | | 370/392 |
| 2015/0281125 A1* | 10/2015 | Koponen | H04L 47/2441 |
| | | | 711/122 |
| 2015/0373164 A1* | 12/2015 | Anand | H04L 49/00 |
| | | | 370/471 |
| 2016/0182509 A1* | 6/2016 | Kantecki | H04L 63/0442 |
| | | | 713/160 |
| 2016/0241482 A1* | 8/2016 | Tsuruoka | H04L 69/16 |
| 2019/0045015 A1 | 2/2019 | Gopinath et al. | |

OTHER PUBLICATIONS

Regnier, et al., "TCP Onloading for Data Center Servers", IEEE Computer Society, Nov. 2004, pp. 46-56.

Goldberg, et al., "Datacenter Network Virtualization in Multi-Tenant Environments", Apr. 2, 2014.

Woo, et al., "Scalable TCP Session Monitoring with Symmetric Receive-side Scaling", pp. 1-7, 2012.

* cited by examiner

| RSS Hash | Destination |
|---|---|
| 8AB6 239F 0133 | Software queue 1 at main memory address xxxxxx |
| 456A 231D EE05 | Software queue 3 at address75.xx.xx.xx |
| ooo | ooo |
| ooo | ooo |
| 789F 234C B543 | Egress port xx |
| ooo | ooo |
| ooo | ooo |

PROTOCOL-INDEPENDENT RECEIVE-SIDE SCALING

CROSS-REFERENCE TO RELATED APPLICATIONS

The present application is a continuation of U.S. patent application Ser. No. 17/187,030, filed Feb. 26, 2021, which is a continuation of U.S. patent application Ser. No. 16/504,709, filed Jul. 8, 2019, which is a continuation of U.S. patent application Ser. No. 15/678,295, filed Aug. 16, 2017, issued on Jul. 23, 2019 as U.S. Pat. No. 10,361,955, which is a continuation of U.S. patent application Ser. No. 14/734,629, filed Jun. 9, 2015, issued on Sep. 5, 2017 as U.S. Pat. No. 9,755,972, the disclosures of which are incorporated herein by reference.

BACKGROUND

Current network interface controller (NIC) implementations either deliver all packets to one place, for software to decode, or have wired-in restricted hardware routing for perhaps four different sequences of headers: {Link, IPv4, TCP}; {Link, IPv4, UDP}; {Link, IPv6, TCP}; {Link, IPv6, UDP}. All other packets are routed to one place for software (or NIC firmware) to decode. None of the software-based results can be routed at anything near line rate, and typically slowed by a factor of 10. A user of such chips cannot have a much-different distribution of packets, such as 100% IPv6/UDP, without overflowing one small dedicated routing table and under-utilizing all the others. An overflowed table means packets for all connections whose routing doesn't fit go to software and suffer a significant slowdown.

Today's NIC implementations that provide for RSS in hardware have wired-in restricted choices for which bytes of a packet to use to create an RSS hash. Any packet format that deviates from the wired-in bits does not get any hardware RSS support, so all such packets must be routed to hypervisor software to select the eventual destination. Encapsulated packets, for example, are not amenable to the standard selection of bits for an RSS hash. Packets routed to the hypervisor for destination selection are slowed.

BRIEF SUMMARY

In one aspect, a method of protocol independent packet distribution includes detecting, based on packet headers of the incoming packet, one or more protocol headers of a set of possible protocol header combinations for routing an incoming packet, the set of possible protocol header combinations being modifiable to include later-developed protocols. The method further includes determining, based on the one or more detected protocol headers, a receive side scaling (RSS) hash M-tuple definition as a protocol-independent arbitrary set of bits, applying the RSS hash M-tuple definition to the header of the incoming packet to form a RSS hash M-tuple header vector, computing a RSS hash from the RSS hash M-tuple header vector, selecting, based on the RSS hash, a particular queue from a set of destination queues identified for the packet, and delivering the packet to the selected particular queue. In some examples, the method may further include determining, for the incoming packet, a flow hash N-tuple definition based on the detected one or more protocol headers, applying the flow hash N-tuple definition to the incoming packet to form a flow hash N-tuple header vector, computing a flow hash from the flow hash N-tuple header vector, identifying, based on the computed flow hash, the set of destination queues for the incoming packet, determining whether the identified set of destination queues are owned by a virtual machine, and delivering the packet directly to the virtual machine, bypassing the hypervisor, if the identified set of destination queues are owned by the virtual machine.

Another aspect provides a chip, including one or more memories and one or more processors. The one or more memories store a plurality of receive side scaling (RSS) hash M-tuple definitions, each definition corresponding to one of a set of possible protocol header combinations for routing an incoming packet, the set of possible protocol header combinations being modifiable to include later-developed protocols. The one or more processors in communication with the one or more memories are configured to detect, based on a packet header of the incoming packet, a pattern of protocol headers, select, based on the one or more detected protocol headers, one of the plurality of RSS hash M-tuple definitions, apply the selected RSS hash M-tuple definition as a protocol-independent arbitrary set of bits to the header of the incoming packet to form a RSS hash M-tuple vector, compute a RSS hash from the RSS hash M-tuple vector, select, based on the RSS hash, a particular queue from a set of destination queues identified for the packet, and deliver the packet to the selected particular queue. In some examples, the one or more memories further store a plurality of flow hash N-tuple definitions, each flow hash N-tuple definition corresponding to one of the set of possible protocol header combinations for routing an incoming packet. Further, the one or more processors may be further configured to determine, for the incoming packet, a flow hash N-tuple definition based on the detected one or more protocol headers, apply the flow hash N-tuple definition to the incoming packet to form a flow hash N-tuple header vector, compute a flow hash from the flow hash N-tuple header vector, identify, based on the computed flow hash, the set of destination queues for the incoming packet, determine whether the identified set of destination queues are owned by a virtual machine, and deliver the packet directly to the virtual machine, bypassing the hypervisor, if the identified set of destination queues are owned by the virtual machine.

Yet another aspect provides a system, including a hypervisor having a first plurality of receive queues, a virtual machine having a second plurality of receive queues, and a chip coupled to the hypervisor and the virtual machine. The chip is configured to receive an incoming packet, detect one or more header protocols in initial bytes of the incoming packet, look up a definition for the packet in a ternary content addressable memory (TCAM) using the initial bytes, and look up a receive side scaling (RSS) hash M-tuple definition in a packet classifier table based on a result of the looking up in the TCAM. The chip is further configured to apply the RSS hash M-tuple definition to the initial bytes of the incoming packet to form an RSS hash M-tuple vector, compute a RSS hash from the RSS hash M-tuple vector, select, based on the RSS hash, a particular queue from a set of destination queues identified for the packet, and deliver the packet to the selected particular queue. In this system, the chip may further determine, for the incoming packet, a flow hash N-tuple definition based on the detected one or more protocol headers, apply the flow hash N-tuple definition to the initial bytes of the incoming packet to form a flow hash N-tuple header vector, compute a flow hash from the flow hash N-tuple header vector, identify, based on the computed flow hash, the set of destination queues for the incoming packet, determine whether the identified set of destination queues are owned by a virtual machine, and deliver the packet directly to the virtual machine, bypassing the hypervisor, if the identified set of destination queues are owned by the virtual machine.

DETAILED DESCRIPTION

Overview

The present disclosure provides for protocol-independent receive side scaling (RSS) and hypervisor bypass for virtual servers. A flow hash is defined over any arbitrary N-tuple, providing flexible forwarding lookup for a destination queue set. Moreover, an RSS hash is used to pick a single queue from the destination queue set, enabling direct packet distribution among receive queues owned by a virtual machine without hypervisor involvement.

A ternary content-addressable memory (TCAM) can be used to identify a pattern of protocol headers for an incoming packet based on a header of the packet. A number of initial bytes of the packet, such as the first 128 bytes, may be used as a lookup key for the TCAM to identify a pattern of protocol headers in the packet. The result of the TCAM lookup is a lowest-numbered matching TCAM row. A length of the packet header, which corresponds to a width of the TCAM, is a design parameter chosen to cover the longest protocol headers to be supported. The matching row number points to an entry in a packet classifier static random access memory (SRAM) that defines a flow hash N-tuple. The entry also defines an RSS hash M-tuple. Each definition selects particular bits from initial bytes of the packet based on the detected header protocols. The bits selected using the flow hash definition are then compacted to form a flow hash N-tuple header vector, and the bits selected using the RSS hash definition are compacted to form a RSS hash M-tuple header vector.

A flow hash function is used to compute a flow hash from the flow hash N-tuple header vector, and an RSS hash function is used to compute a RSS hash from the RSS hash M-tuple header vector. For example, the flow hash function could be secure hash algorithm SHA3, and the RSS hash function could be Toeplitz.

The computed flow hash is used for forwarding lookup. For example, the flow hash is used to lookup a flow hash table to determine a set of destination queues for the packet. If the set of queues are owned by a virtual machine (VM), the hypervisor is bypassed to deliver the packet directly to the VM. In case that there is a lookup miss, the default queue set is the queues owned by the hypervisor. Because the flow hash is defined over any arbitrary N-tuple detected by the TCAM, the forwarding lookup for the destination queue set is protocol independent. This provides increased RSS flexibility to support different protocols. For example, in addition to a typical layer 2- or layer 3-based forwarding lookup, a virtual network ID for a newly developed protocol can be added to the flow hash table for forwarding lookup. Moreover, a secure transport layer can be added to the network, allowing for addition of a security header as part of the forwarding lookup.

The computed RSS hash is used to pick a single queue from the determined set of destination queues. This enables hardware based packet distribution among a set of receive queues owned by the VM directly without hypervisor involvement. For example, the destination may be a queue in user-mode memory, directly emptied by software running in a virtual machine, bypassing a machine's operating system. Moreover, the hash used in the packet distribution is protocol independent, and therefore can be defined over arbitrary header M-tuples over arbitrary protocol headers. For example, in addition to a typical 2-tuple or 4-tuple RSS hash, a good RSS hash for remote direct memory access over converged Ethernet (RoCE) can be supported. Hashing of inner headers on any tunnel protocols can also be supported.

The techniques described above enable server NICs to support protocol independent RSS and hypervisor bypass for virtual servers at line rate. Moreover, the NIC is scalable to support faster rates, such as 400 Gbps and above. The techniques are also advantageous in that it enables fast implementation of newly developed protocols and significantly reduces cost by eliminating the need to replace hardware for every protocol innovation.

Example Systems

Figure 1:
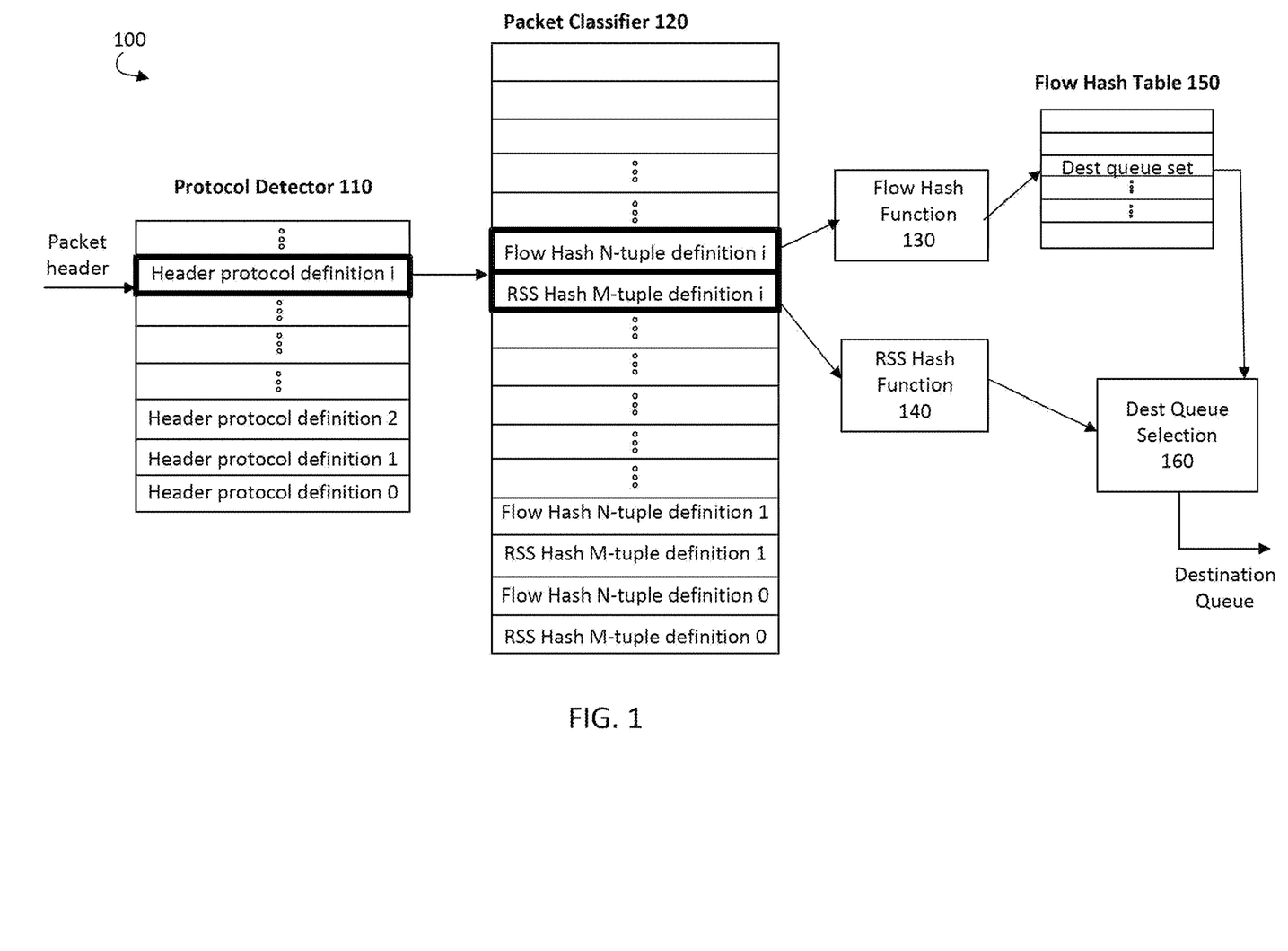
FIG. 1 is an example system diagram in accordance with aspects of the disclosure.

FIG. 1 illustrates a system 100, including a protocol detector 110, a packet classifier 120, hash functions 130, 140, and other components. As a packet is received at a chip, such as a NIC or a switch chip, the protocol detector 110 is used to detect one or more header protocols in the packet. For example, the incoming packet may include any combination of protocol headers, such as link, GRE, TCP, IPv4, IPV6, VLAN, and others. The chip may read a predetermined first number of bytes, such as the first 128 bytes, from the packet headers to determine a pattern of the protocol headers. Based on this pattern, the protocol detector 110 may determine a header protocol definition to be applied.

The protocol detector 110 may be, for example, a ternary content addressable memory (TCAM) that identifies a header protocol definition corresponding to the detected combination of protocol headers. In this example, initial bytes of the packet may be used as a lookup to the TCAM to identify a pattern of protocol headers in the packet. The result of the TCAM lookup is the lowest-numbered matching TCAM row. The length of the packet header portion used as the lookup, which corresponds directly with a width of the TCAM, may be predetermined. For example, the length of the packet header may be a design parameter chosen to cover the longest protocol headers to be supported.

Based on the detected protocol headers, the packet classifier 120 identifies a flow hash N-tuple definition and a RSS hash M-tuple definition. For example, where the protocol detector 110 is a TCAM, the matching row number points to an entry in the packet classifier 120 that defines a flow hash N-tuple and an RSS hash M-tuple. The packet classifier 120 may be, for example, a static random access memory (SRAM) or any other data structure in memory.

Each of the flow hash N-tuple definition and the RSS M-tuple definition selects any desired bits from the packet header over any combination of header protocols. For example, the flow hash definition and RSS hash definition may each be a bit- or byte mask of the packet header, resulting in first and second selected sets of bits, respectively. In one example, the flow hash definition and the RSS hash definition are applied to different portion of the packet header, which portions may or may not overlap. Moreover, the RSS M-tuple definition may be applied to encapsulated packets, thereby selecting bits from inner headers in addition to or instead of selecting bits from outer headers.

The first selected set of bits may be compacted to form a flow hash N-tuple header vector. In some examples, such as described in U.S. Pat. No. 10,320,568, hereby incorporated herein by reference, the flow hash N-tuple header vector may be zero-padded to a predetermined length, and other information such as a flow hash identifier and metadata may be pre-appended thereto. The second selected set of bits may also be compacted to form an RSS hash M-tuple header vector, as discussed in further detail below in connection with FIG. 3.

Flow hash function 130 computes a flow hash from the flow hash N-tuple header vector. For example, the flow hash function 130 could be SHA3, or any other hash function.

RSS hash function 140 computes a RSS hash from the RSS hash M-tuple header vector. The RSS hash may be, for example, a Toeplitz hash or any other hash.

The computed flow hash is used to lookup a flow hash table 150 to determine a set of destination queues for the packet. Because the flow hash is defined over any arbitrary N-tuple detected by the protocol detector 110, the destination queue set is flexible and protocol independent. The set of destination queues may be owned by a hypervisor, a virtual machine, or other components. If the set of destination queues is owned by a virtual machine, the hypervisor may be bypassed and the packet is delivered directly to the virtual machine. If there is a lookup miss, a default queue set may be selected. The default queue set may be, for example, the set of queues owned by the hypervisor.

The RSS hash is used to select a single queue from the set of destination queues, thereby distributing packets among the set of destination queues. For example, the destination queue selection table 160, described in further detail in connection with FIG. 2, correlates the RSS hash with a destination. The destination may be, for example, a memory address or other instructions for handling the packet. Because the RSS hash can be defined over arbitrary M-tuples over arbitrary protocol headers, the packet distribution is protocol independent. If new protocols are developed, the packet classifier 120 and destination queue selection table 160 may be updated, without needing to replace the hardware.

Figure 2:
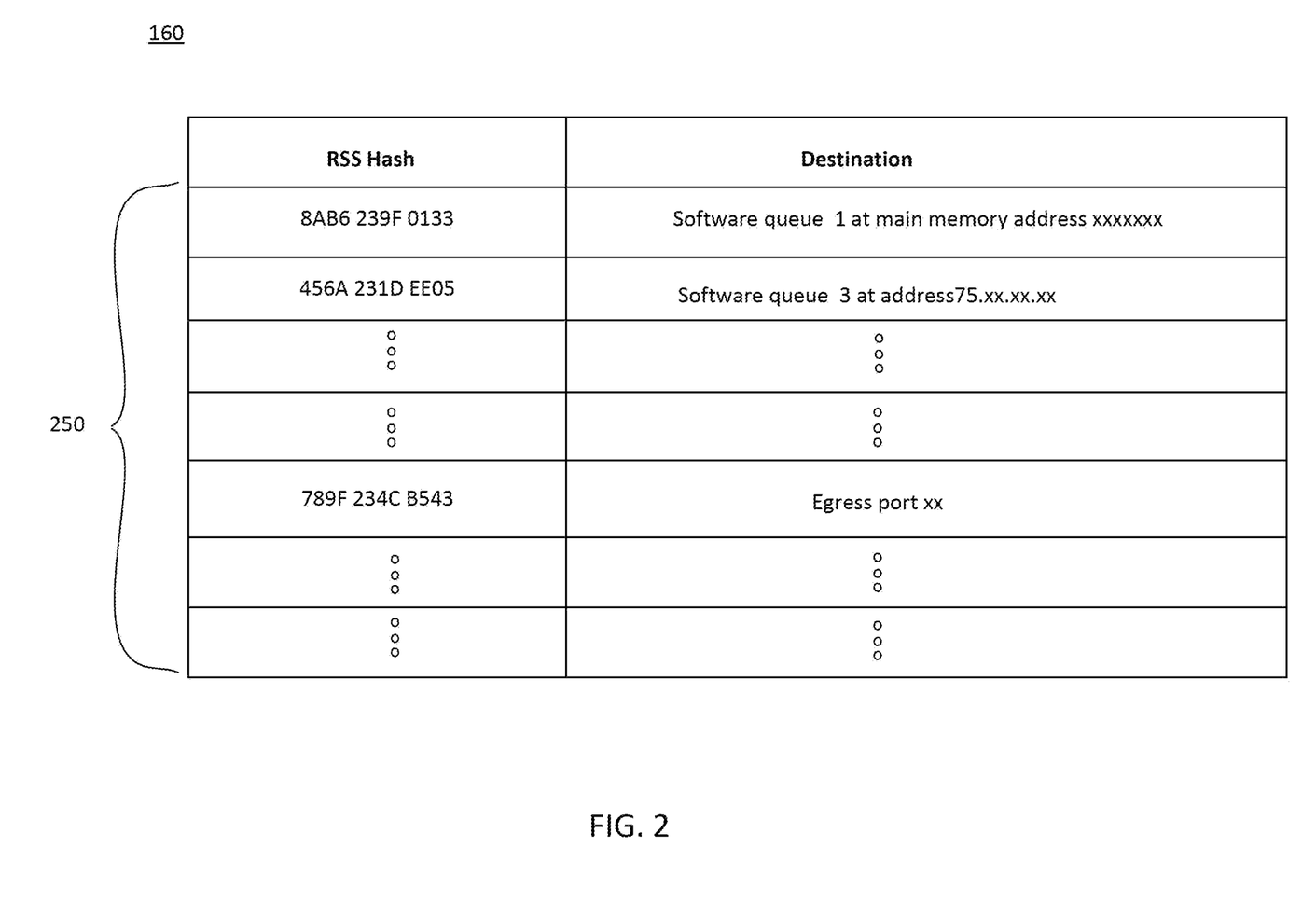
FIG. 2 is an example table in accordance with aspects of the disclosure.

FIG. 2 illustrates an example of the destination queue selection table 160. The table 160 includes a number of entries 250, each entry correlating an RSS hash and destination information, such as a memory address where to send the packet. For example, the destination information may identify a particular receive queue in a hypervisor or virtual machine.

The RSS hash lookup is generated using the RSS definition and hash function, as described in further detail below in connection with FIG. 3. The entries 250 in the destination queue selection table 160 may be updated with RSS hashes and corresponding values when new protocols are developed. In this regard, hardware implementing the flow tables and hash table need not be replaced to accommodate new routing protocols. While only a few entries 250 are shown in FIG. 2, it should be understood that any number of entries may be included in the destination queue selection table 160.

Figure 3:
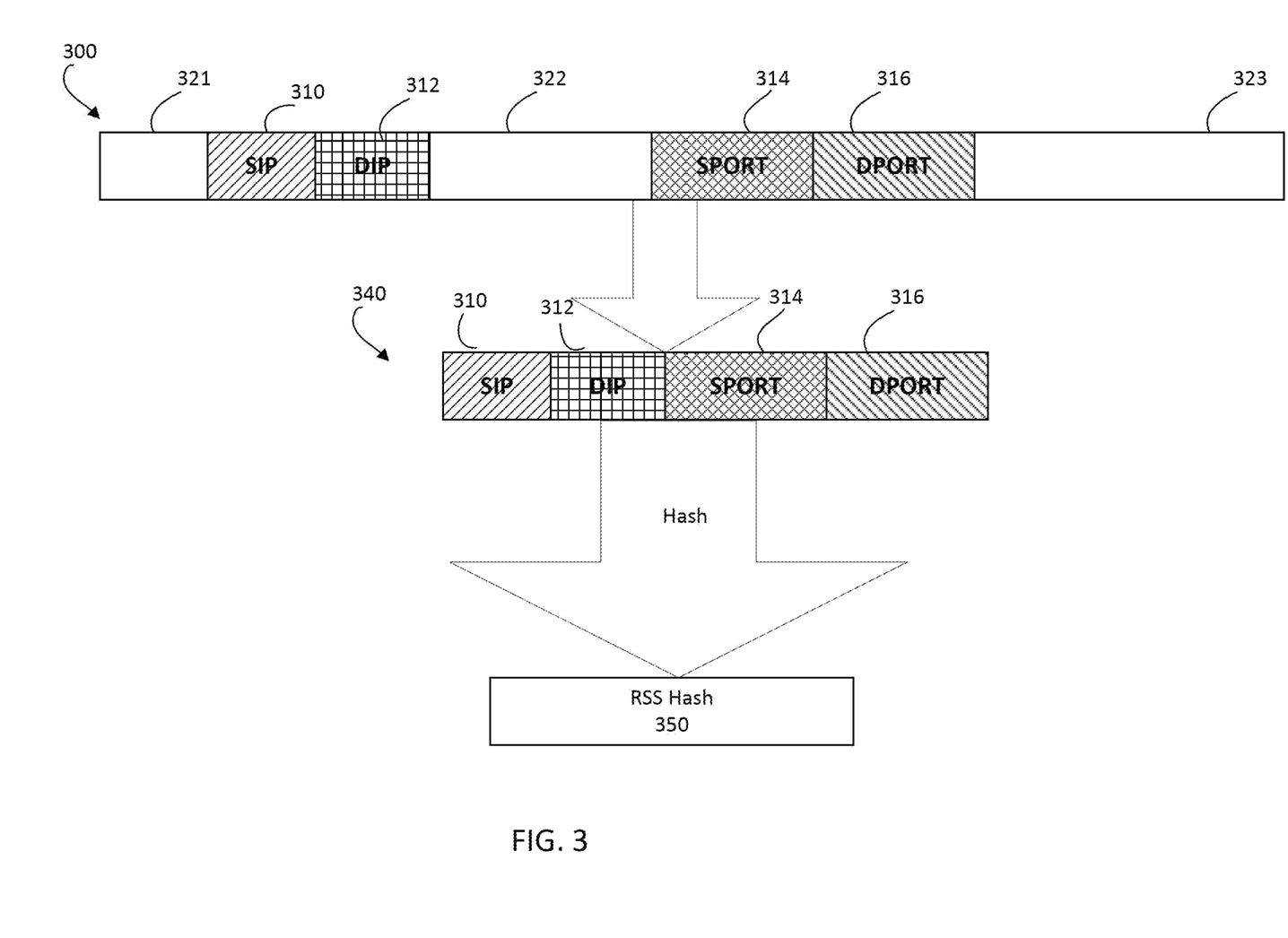
FIG. 3 illustrates an example of generating a lookup in accordance with aspects of the disclosure.

FIG. 3 provides an example of generating the RSS hash for a packet. An M-tuple definition is applied to a packet header 300, wherein the packet header may include any number of header fields for any combination of protocols. The M-tuple definition may be programmed in the packet classifier 120 for the protocol header detected in the packet.

The M-tuple definition may be a bit- or byte-mask of the first M-bits of the packet. For example, referring back to FIG. 3, applying the bit-mask may result in bits 310, 312, 314, 316 of the packet header 300 being selected. In this example, the bits 310 include all or a portion of a source IP address field of the packet header 300, and bits 312 include all or a portion of destination IP fields. Bits 314 includes all or a portion of a source port field, and bits 316 includes all or a portion of a destination port field. While four sets of bits are selected in FIG. 3, the definition may select any number of sets of bits in any arrangement. For example, the selected bits may include bits of inner encapsulated headers as well as outer headers.

The bits selected using the RSS M-tuple definition may be different than bits selected for the flow hash using the flow hash N-tuple definition. In some examples, the bits may overlap. For example, bits selected for the flow hash using the N-tuple definition and bits selected for the RSS hash using the M-tuple definition may both include some common bits. However, the N-tuple bits and the M-tuple bits may also include other bits which differ from one set to the next.

The selected sets of M-tuple bits 310-316 are compacted into an RSS M-tuple vector 340. Unselected bits, such as 321-323, may be ignored. The RSS vector 340 is hashed, for example, using a Toeplitz or other hash. As a result, an RSS hash 350 is generated.

Figure 4:
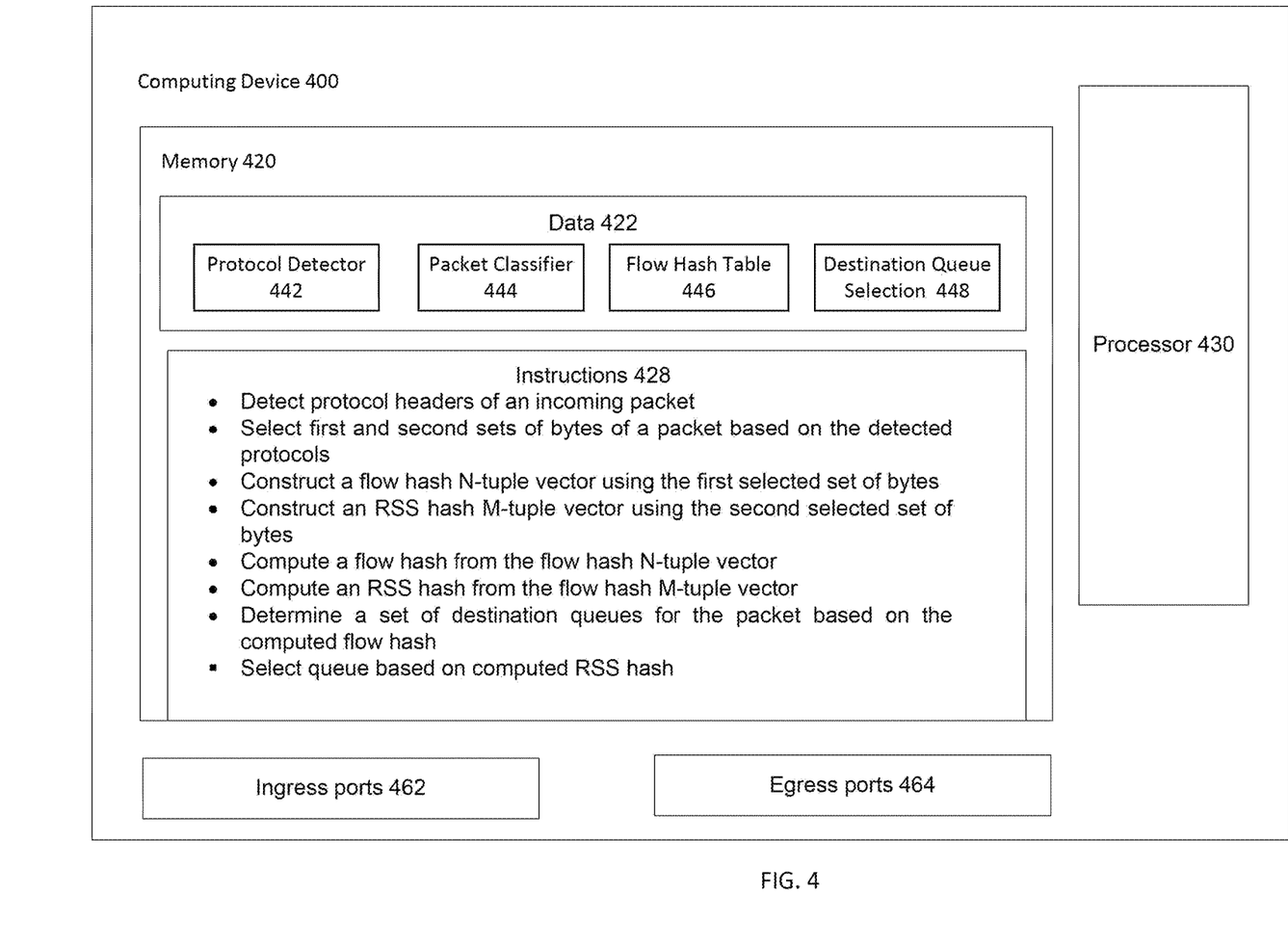
FIG. 4 is an example computing device in accordance with aspects of the disclosure.

FIG. 4 illustrates an example computing device 400 implementing the protocol-independent receive side scaling described above. The computing device 400 may be, for example, an application specific integrated circuit (ASIC), such as a switch chip or a network interface controller (NIC). In other examples, the computing device 400 may be any network component or device capable of receiving and forwarding data or data packets to appropriate destinations of a computer network, such as a network router, a switch, a hub, etc. While only one computing device 400 is shown, numerous computing devices may be interconnected. For example, the computing devices may be wired or wirelessly connected. The computing device 400 may be used for routing packets, for example through a system, datacenter, or network.

The computing device 400 may support various routing protocols, such as link, IPv, IPv6, TCP, UDP, GRE, Internet Control Message, VLAN, etc. Moreover, the computing device 400 may support protocols that have not yet been developed. The computing device 400 may provide a dedicated, full-time connection to a network and also have hardware capable of processing instructions and data stored in the one or more memories. For example, the computing device 400 may be a computer hardware component that may deliver an incoming packet to one or more queues in a computing device's main memory to be forwarded to other network components. In addition, the computing device 400 may provide the connection to other network devices via a wired connection or a wireless connection.

The computing device 400 may include one or more processors 430, one or more memories 420, as well as other components, such as any other hardware used for routing data packets through a network. For example, in one example the computing device 400 may be a switch chip inside a network switch, and may include ingress and egress ports 462, 464. In another example the computing device 400 may be a NIC, and may include a CPU interface (not shown).

The memory 420 may store information accessible by the one or more processors 430, including data 422 instructions 428 that may be executed or otherwise used by the one or more processors 430. For example, memory 420 may be of any type capable of storing information accessible by the processor(s), including a computing device-readable medium, or other medium that stores data that may be read with the aid of an electronic device, such as a volatile memory, non-volatile as well as other write-capable and read-only memories. By way of example only, memory 420 may be a static random-access memory (SRAM) configured to provide fast lookups. Systems and methods may include different combinations of the foregoing, whereby different portions of the instructions and data are stored on different types of media.

The data 422 may be retrieved, stored or modified by the one or more processors 430 in accordance with the instructions 428. For instance, data 422 may include protocol detector 442, packet classifier 444, flow hash table 446, and destination queue selection table 448. In accordance with the instructions 428, protocol headers of an incoming packet are detected, and first and second set of bits of the packet are selected based on the detected protocols. A flow hash N-tuple vector is constructed using the first set of selected bits, and then used to compute a flow hash. An RSS hash M-tuple vector is constructed using the second set of bits, and then used to compute an RSS hash. A set of destination queues for the packet is determined based on the computed flow hash, and a particular queue is selected based on the computed RSS hash. Although the claimed subject matter is not limited by any particular data structure, the data may be stored in computing device registers, in a relational database as a table having a plurality of different fields and records, XML documents or flat files. The data may also be formatted in any computing device-readable format.

The instructions 428 may be any set of instructions to be executed directly (such as machine code) or indirectly (such as scripts) by the one or more processors 430. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 430 may be logic circuitry (e.g., logic gates, flip-flops, etc.) hard-wired into the computing device 400 itself or may be a dedicated application specific integrated circuit (ASIC). It should be understood that the one or more processors 430 are not limited to hard-wired logic circuitry, but may also include any commercially available CPU, or any hardware-based processors, such as a field programmable gate array (FPGA).

Although FIG. 4 functionally illustrates the processor, memory, and other elements of computing device 400 as being within the same block, it will be understood by those of ordinary skill in the art that the processor and memory may actually include multiple processors and memories that may or may not be stored within the same physical housing. For example, memory 420 may be a volatile memory or other type of memory located in a casing different from that of computing device 400. Accordingly, references to a processor or memory should be understood to include a collection of processors and memories that may or may not operate in parallel. Moreover, the various components described above may be arranged on one or more circuit boards, one or more NICs, or part of one or more computing devices.

Example Methods

In addition to the operations described above, various operations will now be described. It should be understood that the following operations do not have to be performed in the precise order described below. Rather, various operations can be handled in a different order or simultaneously, and operations may also be added or omitted.

Figure 5:
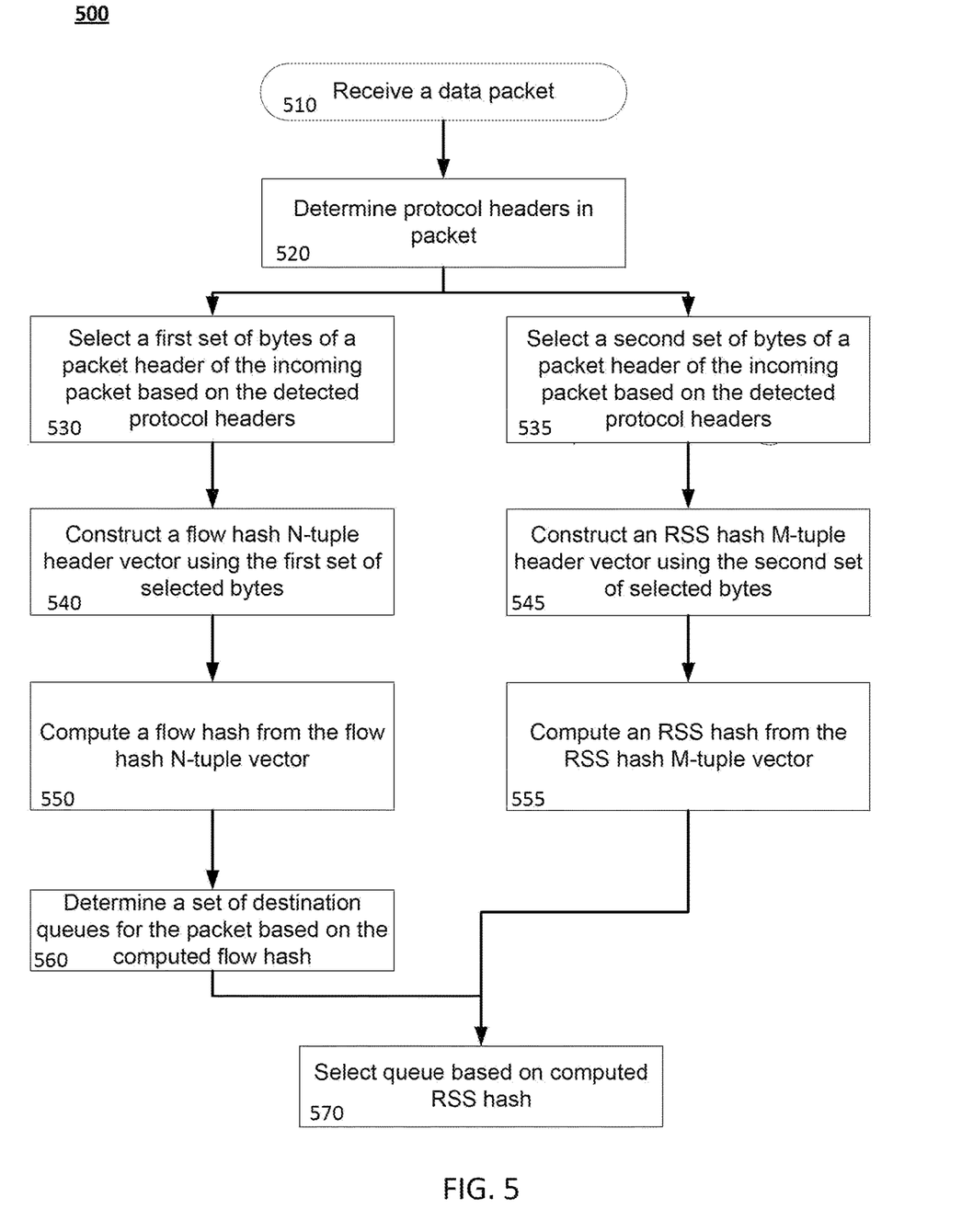
FIG. 5 is an example flow diagram in accordance with aspects of the disclosure.

FIG. 5 provides a flow diagram illustrating an example method 500 of protocol-independent receive side scaling.

At block 510, a NIC, switch chip, or other computing device capable of reading packet contents may receive a data packet to be queued in the computing device's memory and eventually forwarded to a particular network destination.

Upon receipt of the data packet, the computing device may detect (block 520) one or more protocol headers of the packet. For example, the computing device may read a predetermined number of initial bytes from a first data packet, such as the first 128 bytes of the packet, and match the bytes to a plurality patterns stored in a memory, such as a protocol detector TCAM. The memory may store, in correlation with the pattern, an identification of the protocol types. In other examples, the memory may store, in correlation with the pattern, an indication of how the packet should be further processed.

Further processing of the packet may include different sequences of operations, which may be performed in parallel or at different times. One sequence of operations, for example, may be a protocol-independent determination of a set of destination queues for the packet using a flow hash, as described in connection with blocks 530, 540, 550, 560. Another sequence of operations may be a protocol-independent computation of an RSS hash, used for selecting a particular destination queue, as described in connection with blocks 535, 545, 555.

In block 530, a first set of bits of the packet are selected based on the detected protocol headers. For example, the memory may include a packet classifier table identifying a first flow hash definition corresponding to the detected protocols. The definition may include mask bits, mask bytes, or other types of information identifying the portions of the data packet to be selected. The definitions stored in the memory may be updated in order to accommodate new types of protocols. For example, new definitions for newly developed protocols may be added, or old definitions for obsolete protocols may be removed.

In block 540, a flow hash N-tuple vector is constructed using the first selected set of bits. For example, the first selected set of bits may be compacted and concatenated. Moreover, the compacted and concatenated bits may be pre-appended with a unique flow identifier for a flow table and metadata. In some examples, the flow hash N-tuple vector is zero-padded such that the resulting hash vector has a predetermined length.

In block 550, a flow hash is computed using the flow hash N-tuple vector. For example, the flow hash N-tuple vector is hashed with a secret hash key, resulting in a lookup key signature for a flow hash table. The hash function used for this hash may be a secure hash or a simple hash.

In block 560, a set of destination queues for the received packet is determined based on the computed flow hash. For example, the computed flow hash may be used as a lookup in a flow hash table, with a value corresponding to the lookup identifying the set of destination queues.

The set of destination queues may be in operating system memory and be emptied by operating system networking code. In other examples, the set of destination queues may be in user-mode memory and directly emptied by software running in a virtual machine, bypassing the operating system of a real machine and thereby benefitting from increased performance. In further examples, a lookup miss may occur. For example, it may be unknown whether the set of destination queues is owned by a hypervisor or by a virtual machine. In this case, the packet may be routed to the hypervisor. Regardless of where the set of destination queues are, protocol-independent receive side scaling may be used to distribute packets among destinations in the set, as described below.

In block 535, a second set of bits of the packet is selected based on the detected protocol headers. For example, the memory may include a packet classifier table identifying a second RSS hash definition corresponding to the detected protocols. Similar to the flow hash definition, the RSS hash definition may include mask bits, mask bytes, or other types of information identifying the portions of the data packet to be selected. The second set of bits may be the same, different, or overlapping with the first selected set of bits. The RSS hash definitions stored in the memory may also be updated in order to accommodate new types of protocols.

In block 545, an RSS hash M-tuple vector is constructed using the second selected set of bits. For example, the second selected set of bits may be compacted.

In block 555, an RSS hash is computed using the RSS hash M-tuple vector. For example, the RSS hash M-tuple vector is hashed, resulting in an RSS hash. The hash function used for this hash may be a Toeplitz or other hash.

In block 570, the computed RSS hash is used to select a particular destination queue from the set of destination queues determined in block 560. For example, the RSS hash may be used as a lookup for a destination queue selection table. A value corresponding to the RSS hash lookup may identify a destination for the packet.

The above-described aspects of the disclosure may be advantageous in that that a network device may be able to route packets to various destinations at a full line rate regardless of the protocols associated with the packets. Moreover, the above-described features provide for versatility of network chips, which results in reduced costs for updates and efficient use of resources. For example, the routing is protocol independent, and does not assume any fixed distribution of packet headers. Packet distribution uses all available hardware resources.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. The examples and other arrangements may be devised without departing from the spirit and scope of the subject matter defined by the appended claims. Further, the same reference numbers in different drawings can identify the same or similar elements.

The invention claimed is:

1. A method, comprising:
receiving an incoming packet;
identifying packet header information for the incoming packet, comprising detecting one or more protocol headers;
selecting bits from the packet header to hash, wherein the selecting is based on the one or more protocol headers;
computing, using the selected bits, at least one first hash; and
transmitting, based on the computed hash, the incoming packet to a destination.

2. The method of claim 1, wherein the one or more protocol headers can be updated.

3. The method of claim 2, wherein the one or more protocol headers can be updated to adapt to later-developed network protocols.

4. The method of claim 1, wherein the selected bits used to compute the at least one first hash are from an outer header.

5. The method of claim 4, further comprising computing at least one second hash based on an inner header, the at least one second hash being different than the at least one first hash.

6. The method of claim 5, wherein at least one of the inner header or the outer header comprises a protocol identifier.

7. The method of claim 5, wherein the at least one first hash is applied to a different set of bits than the at least one second hash.

8. The method of claim 1, wherein transmitting the packet to a destination comprising delivering the packet to a destination queue.

9. The method of claim 8, wherein transmitting the packet to the destination queue comprises bypassing a hypervisor.

10. A chip, comprising:
one or more memories; and
one or more processors in communication with the one or more memories, the one or more processors configured to:
receive an incoming packet;
identify packet header information for the incoming packet, comprising detecting one or more protocol headers;
select bits from the packet header to hash, wherein the selecting is based on the one or more protocol headers;
compute, using the selected bits, at least one first hash; and
transmit, based on the computed hash, the incoming packet to a destination.

11. The chip of claim 10, wherein the one or more protocol headers can be updated.

12. The chip of claim 11, wherein the one or more protocol headers can be updated to adapt to later-developed network protocols.

13. The chip of claim 10, wherein the selected bits used to compute the at least one first hash are from an outer header.

14. The chip of claim 13, wherein the one or more processors are further configured to compute at least one second hash based on an inner header, the at least one second hash being different than the at least one first hash.

15. The chip of claim 14, wherein at least one of the inner header or the outer header comprises a protocol identifier.

16. The chip of claim 14, wherein the at least one first hash is applied to a different set of bits than the at least one second hash.

17. The chip of claim 10, wherein transmitting the packet to a destination comprising delivering the packet to a destination queue.

18. The chip of claim 17, wherein transmitting the packet to the destination queue comprises bypassing a hypervisor.

19. A system, comprising:
a hypervisor having a first plurality of receive queues;
a virtual machine having a second plurality of receive queues; and
a chip coupled to the hypervisor and the virtual machine, wherein the chip is configured to:
receive an incoming packet;
identify packet header information for the incoming packet, comprising detecting one or more protocol headers;
select bits from the packet header to hash, wherein the selecting is based on the one or more protocol headers;
compute, using the selected bits, at least one first hash; and
transmit, based on the computed hash, the incoming packet to a destination.

20. The method of claim 1, comprising computing at least one second hash, wherein the at least one first hash is used to determine a set of destination queues for the incoming packet and the at least one second hash is used to select a given queue from the set of destination queues.

* * * * *